Patented June 17, 1947

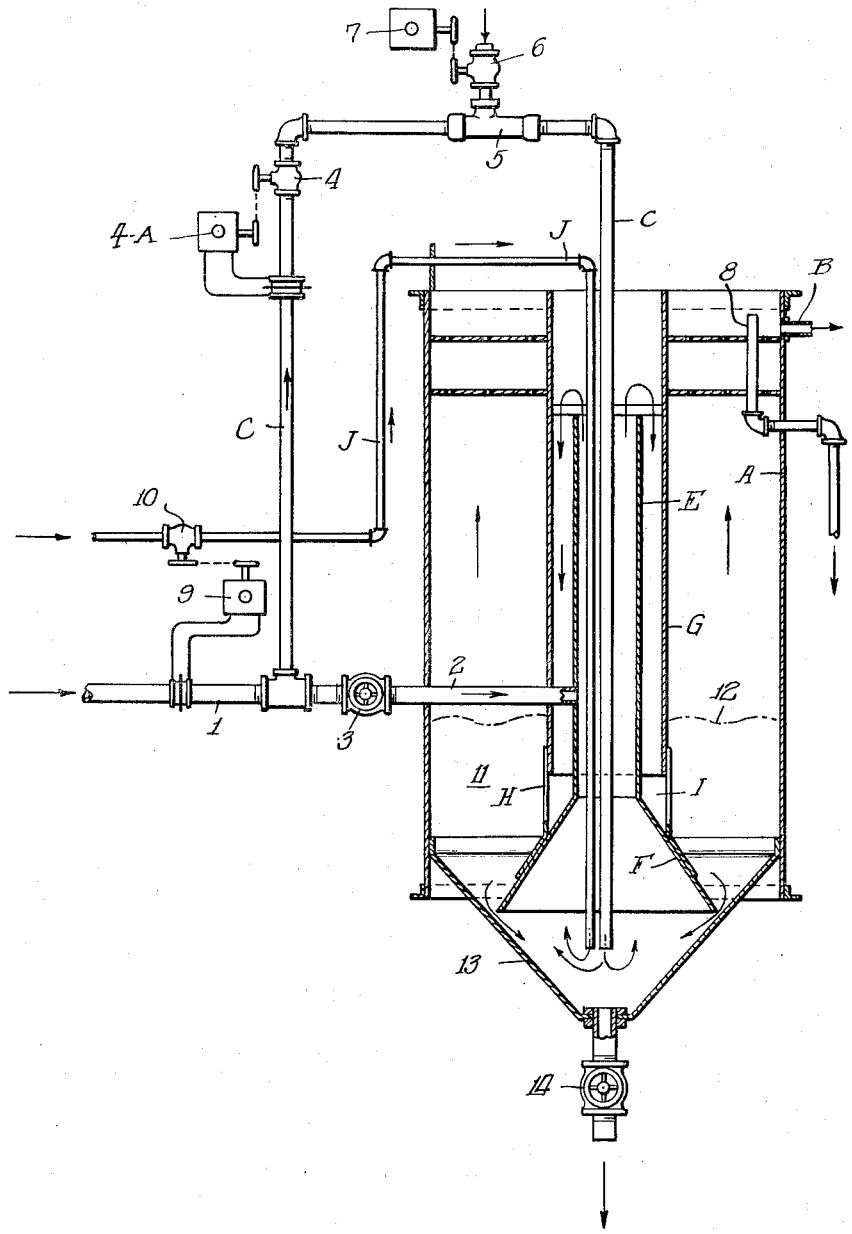

2,422,258

UNITED STATES PATENT OFFICE 2,422,258

LIQUID TREATMENT WITH AUXILIARY FLOW OF LIQUID TO SUSPEND AND PRESERVE A SLUDGE BLANKET

Frank D. Prager, Chicago, Ill., assignor to Graver Tank & Mfg. Co., Inc., a corporation of Delaware Application June 9, 1944, Serial No. 539,525

8 Claims. (Cl. 210—16)

The present invention relates to liquid treatment, particularly, an agitation system applied to various water purifying devices using agitators and settlers.

It is an object hereof to make such devices more operable irrespective of occasional shut-downs of the throughput flow.

The process may utilize the following elementary operations: (1) Entrainment of air by jet action of liquid flowing into the tank at a sufficient velocity; (2) Strong agitation of liquids in the tank by air entrained as mentioned and rising back up through the liquid to be agitated; and (3) Formation of rising and falling currents in the liquid traversed by the air. The first two operations can be applied alone or in combination with the third. A small stream of liquid is used to entrain air, in the first operation, while a large stream of liquid is treated in the second or third operation.

The sole figure of the drawing is a diagram of a simple embodiment of this invention. The settler A is normally filled with liquid up to the level of the main service overflow B. An inlet tube C introduces water requiring purification, but not mixed with reagents, and extends vertically in the center of the settler, from above the bottom to above the top of the settler. It is surrounded by an inner, annular partition or tube E extending from a more elevated point above the bottom upwardly to a point below the top of the tank and having a proper diameter. This tube terminates at the lower portion thereof in form of a cone F, the lower and outer edge of which is suitably spaced from the bottom of the settler. A second or outer, annular partition or tube G is placed concentrically with the tube E. It extends from the top of the tank, above the liquid level, downwardly, and the lower portion ends a certain distance above the cone F, leaving a passage I. Structural members H may be provided for proper support and spacing of the tubes. The space surrounded and defined by the tubes or partitions E and G will be called a circulation zone or compartment.

The basic operation is very simple. The raw water to be treated, not mixed with reagents, enters the treatment plant through a main inlet pipe I. The flow of this water is separated into two portions. A major portion enters the tank A at a suitable point, such as the lower part of the tube E above the cone F, through a pipe 2, communicating with the inlet I and controlled by valve 3. This pipe 2 forms a major branch of the inlet I. A minor portion enters the tank through the aforementioned pipe C, which also communicates with the inlet pipe I and forms a minor or auxiliary branch thereof. This minor portion enters the tank separately, being discharged above the bottom, as mentioned, and flows continuously and uniformly, there being no shut-off valve interposed on the minor water inlet pipe C but a pressure and flow regulator 4 being interposed, which is equipped with a pressure varying or setting device 4—A. Between the pressure regulator and the tank, the tube C has further interposed thereon a conventional injection device 5, which operates according to the jet principle, and which is operated by the water flowing through the pipe C and adapted to draw air into this water. This air may be drawn through a valve 6 controlled by an adjustable device 7.

Above the main outlet B, I provide an auxiliary waste overflow means 8. This waste overflow obviously is operative whenever no water is withdrawn through the main outlet B, if at the same time, water continues to enter the tank. Actually, water will continue to enter the tank at such times, since the minor portion of the flow, as mentioned, flows continuously. The main inlet pipe 2, together with the main outlet B, may be called a normal passage for liquid flowing through the tank; said normal passage having valve means such as valve 3 interposed thereon. The auxiliary, minor inlet branch pipe C, together with the overflow means 8, may be called an auxiliary flow passage. All of this auxiliary passage is operative throughout any periods when flow through the normal passage 2, B is interrupted; however, the inlet part C of the auxiliary flow passage C, 8 is also operative throughout any periods of flow through the normal flow passage 2, B, the flow from pipe I being separated as stated above.

Chemical reagents are introduced by a pipe J, which communicates with the tank adjacent the discharge of the minor water inlet pipe C, below the cone F and above the bottom. In the main inlet I I provide a flow metering device 9, adapted to control a proportioning valve 10 in the chemical inlet pipe J, so that the flow of chemicals is always proportional to the total flow through the main inlet I, that is, proportional to the sum of the major and minor flows although the valve 3 on the major branch 2 can be either open, throttled, or closed, controlling the major flow to a maximum, average, or zero.

The air entrained by the water in the injector 5 and released at the end of the pipe C causes agitation of the water under the cone F, and circulation of water upwardly in the pipe E, downwardly in the pipe G, outwardly over the cone F, and back into the cone, as indicated by the arrows. With properly selected and proportioned chemicals added through the pipe J, bicarbonates and other substances contained in the water are precipitated in form of large and heavy flocs. The aforementioned circulation, when controlled at a proper rate, entrains large numbers of such flocs, and as a result, the chemical treatment under the cone F takes place in the presence of previously formed flocs, and larger and heavier flocs are formed. With a somewhat rapid circulation as aforementioned, such flocs are projected at least some distance into the body of water above the outward stream issuing from the opening I and passing over the cone F, due to the inherent turbulence of this outward stream. A sludge bed 11 is formed by this treatment, and the top 12 of this sludge bed, outside of the pipe G, may rise and fall slightly, depending on the flow rate, temperature, and purity of the raw water entering through the pipe 1 and valve 3, but this level is substantially uniform, so long as the flow through pipe C is uniform. Preferably, the aforementioned circulation is controlled so as to allow sedimentation of at least the heaviest flocs formed in the process on the bottom 13, from where they are ultimately withdrawn through a valve 14.

I have found that very small quantities of water are sufficient to maintain a very adequate circulation of the type as shown by the arrows; and it is known that very desirable results can be obtained by means of such a circulation.

The basic structure identified by the letters A—B—E—F—G—H—I is known from the French patent, 394,632, to Lamy.

My present improvement in its entirety can be viewed, in one respect, as a modification of said French patent, being particularly directed towards a manner of obtaining said desirable results whenever the input of water falls below a certain amount, or ceases altogether. At such times, the aforementioned circulation ceases. Thereafter, it is a somewhat difficult and time consuming task to re-establish normal operation.

It has occurred to me, pursuant to the findings as mentioned, that this defect can be remedied by passing the major amounts of inflow, at maximum flow, through the pipe 2, which can be regulated by valve 3, and otherwise, in accordance with actual needs, while passing only minor, but substantially continuous amounts of inflow through the pipe C incorporating the air injector 5.

I found further on that best results are achieved with a continuous and uniform amount of air-induced circulation, regardless of variations of the total throughput flow. For this reason, I use the pressure and flow regulator 4, 4A in the pipe C supplying the air injector 5 with an operating fluid.

Of course, in some instances it would be simpler to blow controlled amounts of compressed air into the tank A. However, compressed air is not always available, and a pressure regulator 4, with or without the additional air-regulating device 6, 7, is frequently more economical than a separate air blower or compressor, or mechanical equivalent thereof. It also tends to be more reliable, particularly in case of power failure.

An unexpected advantage of using such a separate, minor, but continuous flow, resides in the fact that in case of shut-downs of the major throughput flow, the device remains in a more operable condition than when using compressed air or the like. Attention is directed to the fact that I control the chemical feed through the valve 10 in the pipe J in proportion with the total flow through the main inlet 1. As a result, chemicals are proportionally added even during a complete shut-down of the major flow through valve 3 in pipe 2. Efficient operation of the device depends on the maintenance of the sludge bed 11 in the tank. Such a sludge bed in the first place must be kept suspended regardless of a shut-down of the major flow, in order to avoid re-starting difficulties and losses. This could be done by compressed air as well as by the water, entrained air and chemicals. However, when suspending a sludge bed by compressed air, or mechanical equivalents, the continuous agitation, not accompanied by a proper feed of chemicals, and bicarbonates reacting with the same tends to ruin the sludge bed. Therefore, a major throughput flow can be shut down only for a very limited time without injury to the sludge bed, if the sludge bed is suspended by compressed air or mechanical equivalents. This limitation is avoided hereby; that is, the major throughput flow can be shut down unconditionally, without injury to the sludge bed, this bed being suspended by a medium, such as water and air from pipe C, the introduction of which is automatically accompanied by a proper feed of chemicals.

As mentioned before, this advantage is gained by means of a very small flow of water going to waste through the overflow 8; and the required amount of chemicals is proportionally small and inexpensive.

Persons skilled in the art will readily understand that the energy inherent in the minor flow through the pipe C may be applied through the medium of injected air as shown, or in various other ways; and that other modifications can be applied.

I claim:

1. Apparatus for liquid treatment with separation of solids, comprising a tank; two inlet ducts for untreated liquid, communicating with central parts of said tank; an additional inlet duct for treatment reagents communicating with central parts of said tank; two outlet ducts for treated liquid, communicating with upper parts of said tank, remote from said central parts; said central and remote upper parts of said tank communicating with one another; a valve in one of said inlet ducts; a pressure regulator in the other inlet duct; an air injector interposed on the other inlet duct, between said pressure regulator and said tank and adapted to draw air into the untreated liquid flowing through said other inlet duct, for release in said tank; and an outlet duct for separated solids, communicating with a lower part of said tank.

2. Apparatus for liquid treatment with separation of solids, comprising a tank; a first and a second inlet duct for untreated liquid communicating with said tank; a third inlet duct for treatment reagents communicating with said tank; means adapted to proportion the amounts of reagents flowing through said third inlet duct to the sum of the amounts of untreated liquid flowing through said first and second inlet ducts; a pressure regulator in said second inlet duct; air injector means associated with said second inlet duct, between said regulator and the discharge end of the duct, to draw air into the untreated liquid flowing through the second duct, for release in said tank; two outlet ducts for treated liquid communicating with said tank; and a third outlet duct for separated solids, communicating with said tank.

3. Apparatus for liquid treatment with separation of sludge, comprising a tank; substantially cylindrical, partition means in said tank, extending from the top of the tank to above the bottom of the tank to define a circulation compartment located in said tank and communicating with a lower part thereof; a main inlet conduit for liquid to be treated, entering said circulation compartment; an auxiliary inlet conduit for liquid to be treated, separately entering said circulation compartment; pressure regulator means in said auxiliary conduit outside said tank; air injector means in said auxiliary conduit, between said pressure regulator means and said tank, adapted to be operated by liquid flowing through said auxiliary conduit and to draw predetermined amounts of air into such liquid, to enforce a predetermined liquid circulation in said circulation compartment upon the discharge of such flowing liquid with the air drawn into it; an additional inlet conduit for treatment reagents communicating with said circulation compartment; a service outlet for treated liquid and a waste liquid outlet, both located remotely from said circulation compartment, adjacent the top of said tank; and a sludge outlet in a lower part of said tank.

4. Apparatus according to claim 3 wherein said auxiliary inlet conduit branches off from said main inlet conduit, outside said tank; and which apparatus comprises a valve on said main inlet conduit, between said auxiliary inlet conduit and said tank.

5. Apparatus for water treatment with separation of sludge, comprising a tank; an inner, annular partition extending from adjacent but above the bottom to adjacent but below the top of said tank; an outer, annular partition concentric with said inner one and extending from the top of said tank downwardly to substantially below the top of the inner annular partition; said partitions being open at their ends to define a circulation compartment located in the inner part and communicating with the lower outer part of said tank; a main inlet pipe for water to be treated, discharging into said circulation compartment; a smaller, auxiliary water inlet pipe, branched off from said main inlet pipe outside said tank, and discharging into said circulation compartment; a valve in said main inlet pipe between said auxiliary pipe and said tank; a pressure regulator, interposed on said auxiliary pipe outside said tank; an air injector, interposed on said auxiliary pipe between said pressure regulator and said tank, and adapted to be operated by water flowing through said auxiliary pipe, to draw air into such water; means to discharge chemicals into said circulation compartment; flow rate responsive means on said main inlet pipe ahead of said auxiliary pipe; proportioner means adapted to be controlled by said flow rate responsive means and to control said means to discharge chemicals; a service outlet for treated water and a waste water outlet, both located outside said circulation compartment, adjacent the top of said tank; and a sludge outlet in a lower part of said tank.

6. In a method of liquid treatment wherein a sludge bed is formed and maintained in a lower part of a tank, the steps of normally passing a major flow of untreated liquid into said bed and a flow of treated liquid from the tank above said bed; interrupting said flows for shutdown periods; passing an auxiliary, minor flow of untreated liquid into said bed during such shutdown periods as well as normally; passing a flow of sludge precipitating chemicals into said bed during such shutdown periods as well as normally; withdrawing treated liquid to waste from said tank above said bed during such shutdown periods; and removing sludge from said bed.

7. Method according to claim 6 comprising the step of controlling said minor flow to maintain a predetermined rate thereof during such shutdown periods as well as normally.

8. Method according to claim 6 comprising the steps of controlling said minor flow to maintain a predetermined rate thereof during such shutdown periods as well as normally; and drawing air into said controlled, minor flow, whereby such air is released in the tank, together with the untreated liquid of said minor flow.

FRANK D. PRAGER.

REFERENCES CITED

The following references are of record in the file of this patent:

UNITED STATES PATENTS

| Number | Name | Date |
| --- | --- | --- |
| 1,123,011 | Ripley | Dec. 29, 1914 |
| 935,637 | Bull | Oct. 5, 1909 |
| 1,030,366 | Winters | June 25, 1912 |
| 2,365,293 | Robinson | Dec. 19, 1944 |

FOREIGN PATENTS

| Number | Country | Date |
| --- | --- | --- |
| 394,632 | France | Jan. 8, 1909 |
| 23,515 | France | Nov. 30, 1921 |